United States Patent [19]

Lorenzen et al.

[11] Patent Number: 5,341,082

[45] Date of Patent: Aug. 23, 1994

[54] REVERSE CURRENT FLOW PROTECTOR FOR ELECTRICITY STORAGE SYSTEMS

[76] Inventors: April D. Lorenzen; Randall T. Wheeler, both of 39 Walcott Ave., Jamestown, R.I. 02835

[21] Appl. No.: 675,023

[22] Filed: Mar. 25, 1991

Related U.S. Application Data

[63] Continuation-in-part of Ser. No. 324,252, Mar. 15, 1989, abandoned.

[51] Int. Cl.$^5$ ............................................. H02J 7/00
[52] U.S. Cl. ........................................ 320/9; 320/40; 320/61; 323/906
[58] Field of Search ................. 320/9, 31, 32, 39, 40, 320/61; 323/906

[56] References Cited

U.S. PATENT DOCUMENTS

| | | | |
|---|---|---|---|
| 3,919,617 | 11/1975 | Tippett et al. | 320/39 |
| 4,164,698 | 8/1979 | Kleeberg | 320/40 X |
| 4,243,928 | 1/1981 | Nazimek | 320/61 X |
| 4,291,266 | 9/1981 | Portmann | 320/40 X |
| 4,311,953 | 1/1982 | Fukuda et al. | 320/40 X |
| 4,314,198 | 2/1982 | Rogers | 323/906 X |
| 4,383,211 | 5/1983 | Staler | 320/9 |
| 4,401,935 | 8/1983 | Yerkes | 320/9 |
| 4,483,319 | 11/1984 | Dinh | 363/42 X |
| 4,539,516 | 9/1985 | Thompson | 320/61 X |
| 4,742,291 | 5/1988 | Bobier et al. | 320/39 |
| 4,884,017 | 11/1989 | Williams | 323/906 X |
| 4,963,811 | 10/1990 | Weber | 323/906 X |
| 5,164,654 | 11/1992 | Bertram et al. | 320/61 |
| 5,196,781 | 3/1993 | Jamieson et al. | 320/61 |
| 5,218,284 | 6/1993 | Burns et al. | 320/9 X |

Primary Examiner—Kristine L. Peckman

[57] ABSTRACT

Improved circuitry for connecting a generator to a battery with a very low voltage drop conductive path whenever the generator is capable of charging the battery, yet preventing reverse current flow when the generator is not capable of charging the battery. Mechanical contacts are employed to maintain a low voltage drop connection and are controlled to open and close by known techniques. In the preferred embodiment, sensing when the generator is no longer generating sufficiently to substantially charge the battery is accomplished by monitoring the polarity of the tiny voltage drop across the closed mechanical contacts. With the mechanical contacts open, sensing when the generator begins generating sufficiently to charge the battery is accomplished by monitoring the forward voltage drop across a blocking diode in series between the generator and battery. The mechanical contacts are in parallel with the diode, so the diode voltage drop is eliminated when the mechanical contacts are closed.

21 Claims, 8 Drawing Sheets

REVERSE CURRENT FLOW PROTECTOR FOR ELECTRICITY STORAGE SYSTEMS

This is a continuation-in-part of Ser. No. 07/324,252 filed on Mar. 15, 1989 (abandoned).

BACKGROUND

1. Field of the Invention

Where an electricity generator is used to charge a device capable of storing electricity, some method must be used to prevent reverse current flow from the storage device backwards through the generator while the generator potential is lower than the storage device potential. The instant invention has applications in many types of electricity generating/storage systems. The example circuitry described herein shows a solar cell as the electricity generator and a battery as the storage device.

2. Discussion of Prior Art

In most systems where an electrical generator charges an electrical storage device (such as a battery), the generator needs to be isolated from the storage device whenever the generator is not capable of charging the storage device.

One well-known isolation method is to place a blocking diode in series between the generator and the battery. Charging current is passed by the diode, yet reverse current flow which could be damaging to the generator is prevented. The disadvantage to using a blocking diode is that the voltage drop across the diode causes a substantial energy loss, especially in low voltage systems. In the case of a photovoltaic generator, the diode voltage drop forces the voltage operating point of the solar cell higher, which lowers the current output of the solar cell.

Another well-known isolation method is that used in the Volkswagen Beetle automotive voltage regulator for D.C. generators, part #0 190 350 068. Because it is inexpensive and readily available, this type of regulator has been used in photovoltaic battery charging systems. The regulator has a so-called cut-out coil which controls a single pole double throw set of relay contacts. The moveable contact is connected to one side of the coil, one stationary contact is grounded, and one stationary contact is connected to the battery. Thus the relay acts to connect the battery to the generator whenever the generator output exceeds a certain current level, and to disconnect the generator from the battery when the generator output falls below that current level. While this method avoids the use of a blocking diode, it has several disadvantages. All charging current must pass through the cut-out coil, so there is a trade-off in the design of the coil.

If the coil is made up of heavy wire with few turns the voltage drop across the coil will be relatively low, but the current level at which the generator connects and disconnects with the battery will be quite high. In other words, much energy is wasted because the generator is not connected to the battery as soon as the generator is able to charge the battery, and the generator is disconnected from the battery while the generator is still capable of charging the battery.

If the coil is made up of fine wire with many turns the coil will be more sensitive, and will connect/disconnect at a lower current level. However, the voltage drop losses across the coil would be unacceptably high at higher currents.

A blocking diode cannot be added to conduct available power while the relay contacts are open because the diode would short the relay coil, preventing the coil from pulling the contacts in to make the direct connection between generator and battery.

Modern engineers have made several attempts to eliminate or bypass the blocking diode.

In U.S. Pat. No. 4,383,211 relay contacts are in parallel with a blocking diode and a timer mechanism is used to determine when to close and open the relay contacts, making or breaking the direct connection between a solar cell and a battery. This circuit cannot accurately detect when the solar cell starts or stops generating sufficiently to charge the battery. Connecting/disconnecting based on a fixed timer pattern has obvious disadvantages. The solar cell will not be connected to the battery at some times when the solar cell is capable of charging the battery. The solar cell will be connected to the battery at some times when the solar cell is not capable of charging the battery. Reverse current flow can occur which unnecessarily discharges the battery and can damage the generator.

In U.S. Pat. No. 4,742,291 no blocking diode is used. Relay contacts are used to connect/disconnect a solar cell and a battery. With the relay contacts open, the open circuit voltage of the solar cell is compared to the battery voltage. When the open circuit solar cell voltage is at least equal to the battery voltage, the relay contacts are closed for about 1 minute and then the relay contacts are opened if a current shunt monitor does not detect charging current. This cycling on and off continues until the solar cell produces enough power to begin charging the battery.

U.S. Pat. No. 4,742,291 does not discuss how the solar cell is disconnected from the battery if the battery is still in need of charging when the solar cell ceases to generate sufficiently. However, the action of the circuit under that common circumstance is easily surmised. The current shunt monitor would detect no charging current and the timer would begin cycling, opening the relay contacts after about 1 minute. Because a solar cell has a much higher open circuit voltage than voltage under load, the relay contacts would be controlled to close again by the battery voltage vs. open circuit solar cell voltage monitor. The on and off cycling would continue until ambient light level falls so low that the solar cell open circuit voltage is less than the battery voltage, or until ambient light level rises high enough for the current detect monitor to keep the relay contacts closed.

While the circuitry shown in U.S. Pat. No. 4,742,291 eliminates using a blocking diode, it has several disadvantages. It cannot detect when the solar cell is capable of charging the battery while the relay contacts are open. Inevitably, the solar cell is directly connected to the battery before the solar cell is able to charge the battery, allowing reverse current flow for a period of time. Under cloudy conditions when the solar cell output hovers just under the threshold of the current monitor detect, needless on/off cycling can continue for many hours.

Many, if not most users of solar charged battery operated devices need every last bit of voltage and current that can be squeezed out of their system. Size vs. energy output is commonly of concern to purchasers of solar cells. The potential energy wasted through the use of blocking diodes or imprecise relay controls is gross when compared to the intense emphasis on utmost efficiency that surrounds other aspects of solar cell design and use. Most users, therefore, would find it very desirable to have a more efficient alternative to blocking diodes and previously available relay controls.

OBJECTS AND ADVANTAGES

Accordingly, several objects and advantages of my invention are:
(a) to provide such a device which protects the generator from reverse current flow by disconnecting the storage device from the generator while the generator is not capable of charging the storage device.
(b) to provide such a device which provides a very low voltage drop connection between the generator and the storage device at all times when the generator is capable of substantially charging the storage device.
(c) to provide such a device which is highly accurate and which has a built in hysteresis between the connection and disconnection thresholds, eliminating on/off cycling when conditions have not changed between the on and the off cycle.
(d) to provide such a device having a design which can easily be altered to accommodate the full range of possible system voltages and currents.

Readers will find further objects and advantages of the invention from a consideration of the ensuing description and the accompanying drawings.

BRIEF DESCRIPTION OF THE DRAWINGS

Please note that in FIGS. 6A, 7A, and 8A the relay contacts are shown in the SET position which occurs when the SET coil has been activated most recently.

DETAILED DESCRIPTION

Figure 1A:
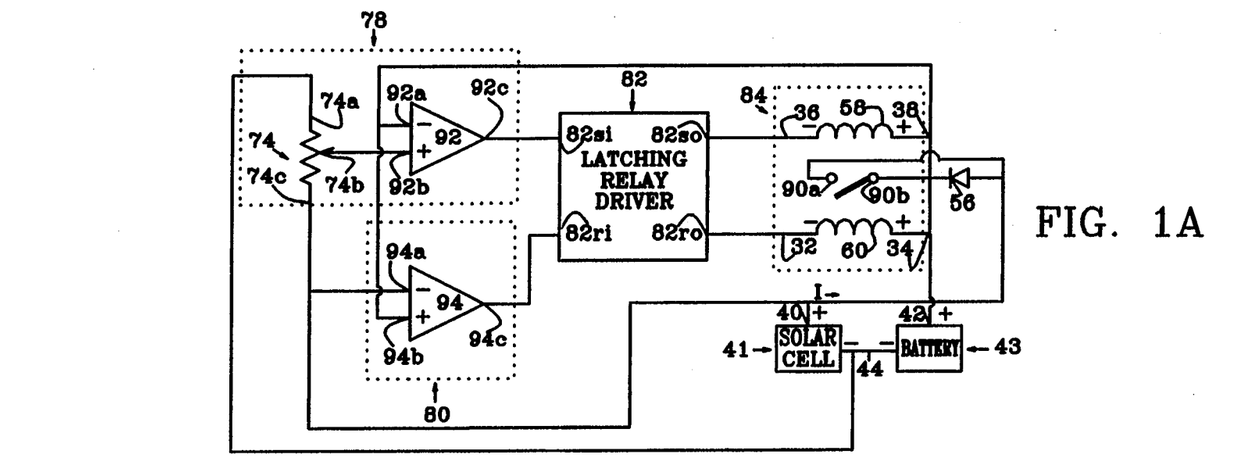
FIG. 1A is a schematic representation of the preferred embodiment.

The instant invention eliminates all the disadvantages of the prior art by successfully implementing an original circuit design. The preferred embodiment shown in FIG. 1A is one example. A battery (43) is selectively connected to a solar cell (41) through a relay (84). Relay (84) is controlled to open and close relay contacts (90a, 90b) by a relay driver (82). Relay driver (82) is controlled by a first sensor circuit (78) to put relay contacts (90a, 90b) in a closed condition. Relay driver (82) is controlled by a second sensor circuit (80) to put relay contacts (90a, 90b) in an open condition.

Solar cell (41) is kept under load by a load circuit while relay contacts (90a, 90b) are open. In this instance, the load circuit is a diode (56) connected in parallel with relay contacts (90a, 90b).

First sensor circuit (78) includes a comparator (92) and a potentiometer (74). Potentiometer (74) is used as a voltage divider network to slightly reduce solar cell (41) voltage for input to comparator (92). Potentiometer center terminal (74b) is connected to comparator+input (92b). Potentiometer terminal (74a) is connected to ground (44). Potentiometer terminal (74c) is connected to the anode of diode (56). Comparator−input (92a) is connected to the cathode of diode (56). Comparator output (92c) is connected to relay driver SET input (82si).

As with any standard diode, at very low forward currents, diode (56) has a forward voltage drop which is less than the rated forward voltage drop. Until the rated forward voltage drop level is reached, forward voltage drop increases with increased current flow. In the circuit of FIG. 1A, solar cell (41) voltage must exceed battery (43) voltage in order for diode (56) to conduct in the forward direction. Potentiometer (74) is set so that the voltage at comparator input (92b) is solar cell (41) voltage reduced by the value of diode (56) forward voltage drop at a very low current level. A typical value chosen is 0.5 volts if diode (56) has a normal forward voltage rating of 0.6 volts.

Thus, with relay contacts (90a, 90b) open, an accurate determination is made as soon as solar cell (41) has both the required voltage output and the required current output to begin charging battery (43). When the voltage drop across diode (56) exceeds 0.5 volts, comparator output (92c) enables relay driver (82) to cause relay contacts (90a, 90b) to close, bypassing diode (56) and making a direct connection between solar cell positive (40) and battery positive (42).

Second sensor circuit (80) includes a comparator (94) connected to monitor the polarity of the voltage drop across relay contacts (90a, 90b). Comparator−input (94a) is connected to relay contact (90a). Comparator+input (94b) is connected to relay contact (90b). Comparator output (94c) is connected to relay driver RESET input (82ri).

When solar cell (41) ceases to generate sufficient voltage and current to charge battery (43), current begins to flow in reverse and the tiny voltage drop across relay contacts (90a, 90b) reverses polarity. This event triggers comparator output (94c) to enable relay driver (82) to cause relay contacts (90a, 90b) to open, disconnecting solar cell positive (40) from battery positive (42).

Figure 1B:
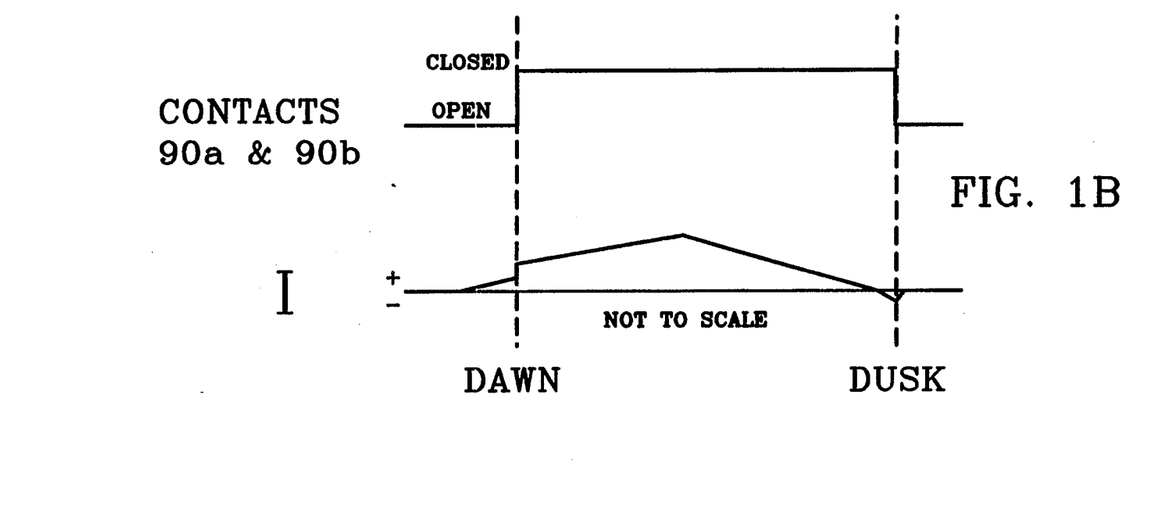
FIG. 1B is a timing diagram showing charging current vs. when the relay opens and closes in FIG. 1A.

As shown in FIG. 1B, hysteresis is built into this circuit design because separate sensor circuits are used for determining when to connect the solar cell to the battery and when to disconnect. First sensor circuit (78) has a higher threshold than second sensor circuit (80) threshold. This prevents on/off cycling of relay contacts (90a, 90b) when conditions have not actually changed between the on and the off cycle.

Figure 2A:
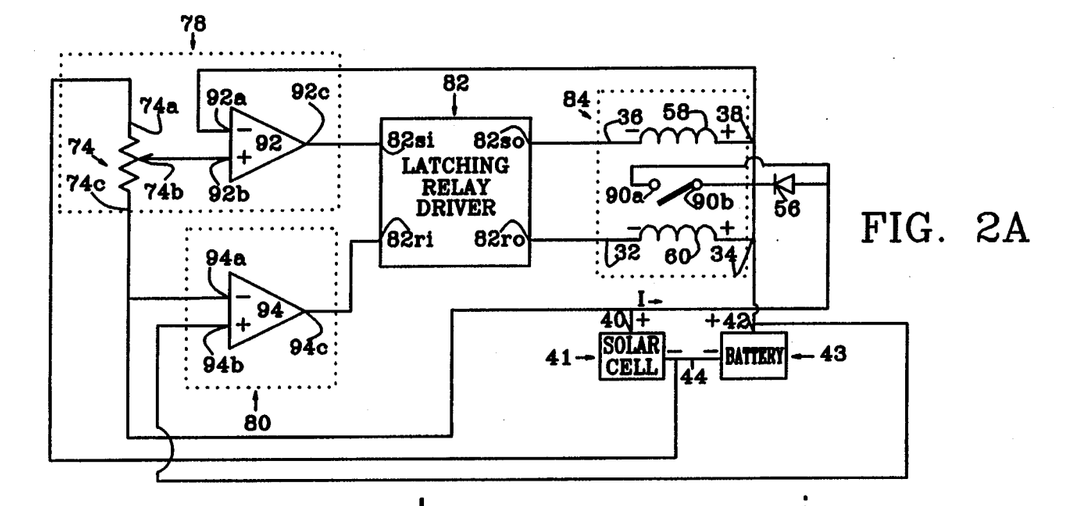
FIG. 2A is a schematic representation of a variant of the preferred embodiment.
Figure 2B:
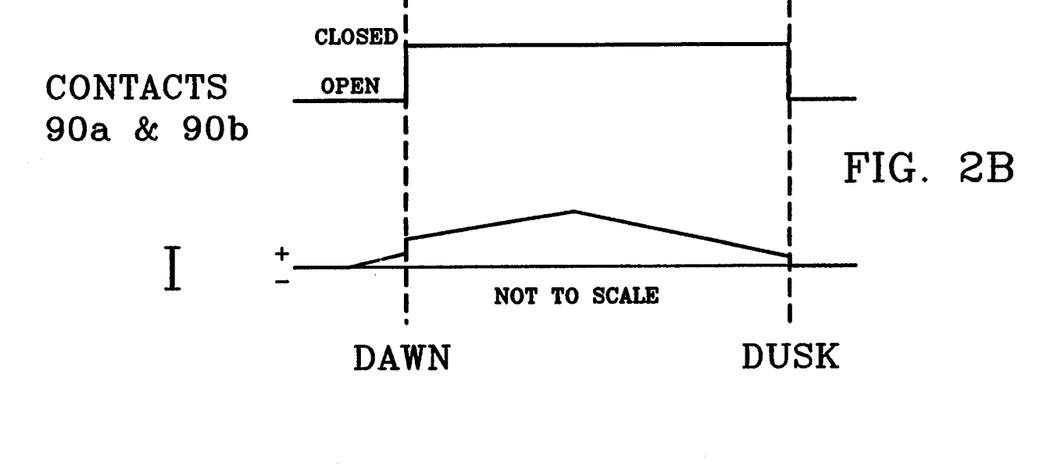
FIG. 2B is a timing diagram showing charging current vs. when the relay opens and closes in FIG. 2A.

FIG. 2A shows a variant of the preferred embodiment. The components, connection points, and conductors between solar cell (41) and battery (43) form a connecting path for current flow. In the circuit shown in FIG. 2A, the voltage supplied to comparator input (94b) is altered by connecting comparator input (94b) to a point on the connecting path closer to battery (43) instead of connecting comparator input (94b) to the cathode of diode (56). This adjusts the trigger point so that relay contacts (90a, 90b) will be controlled to open before reverse current flow occurs, as soon as solar cell (41) output falls to a predetermined minimum level. This is graphically illustrated in FIG. 2B.

Figure 3A:
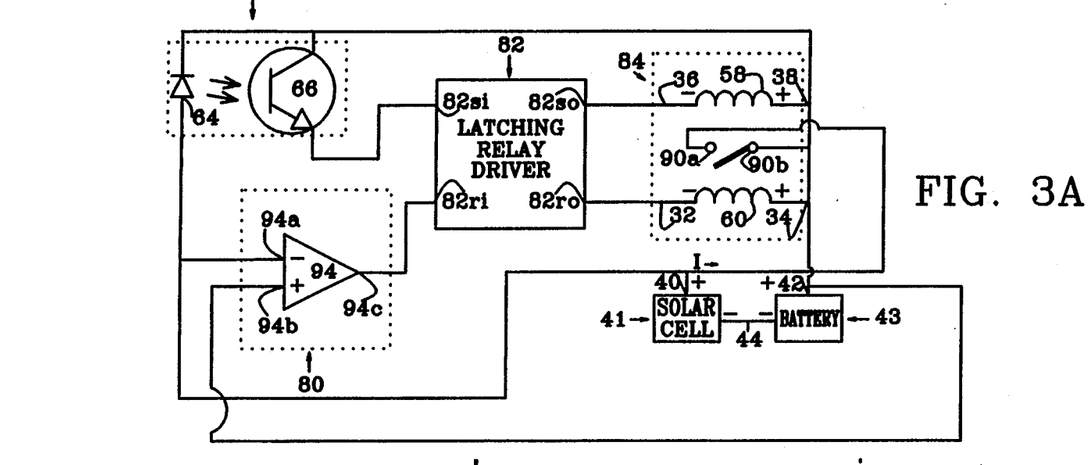
FIG. 3A is a schematic representation of a variant of the preferred enbodiment including an optoisolator.
Figure 3B:
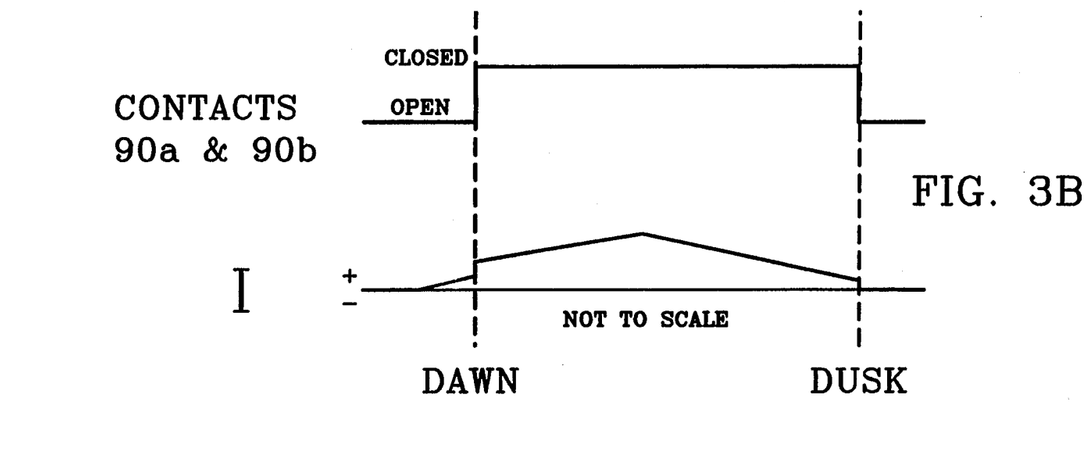
FIG. 3B is a timing diagram showing charging current vs. when the relay opens and closes in FIG. 3A.

FIG. 3A shows another variant of the preferred embodiment. An optoisolator (62) is included as the first sensor circuit and as the load circuit. Optoisolator output element (66) is connected to relay driver SET input (82si). A selectively luminous element such as the LED (64) of optoisolator (62) is connected in parallel with relay contacts (90a, 90b). Optoisolator LED (64) anode is connected to relay contact (90a) and optoisolator LED (64) cathode is connected to relay contact (90b). As soon as solar cell (41) voltage exceeds battery (43) voltage by an amount equal to the forward voltage of optoisolator LED (64) and solar cell (41) produces current sufficient to light optoisolator LED (64); optoisolator output element (66) conducts, enabling relay driver (82) to cause relay contacts (90a, 90b) to close. The particular optoisolator model chosen will determine the solar cell (41) power output required at the threshold point. FIG. 3B shows a timing diagram of a typical daytime cycle and the relative current levels (I) when contacts (90a, 90b) are opened and closed.

Figure 4A:
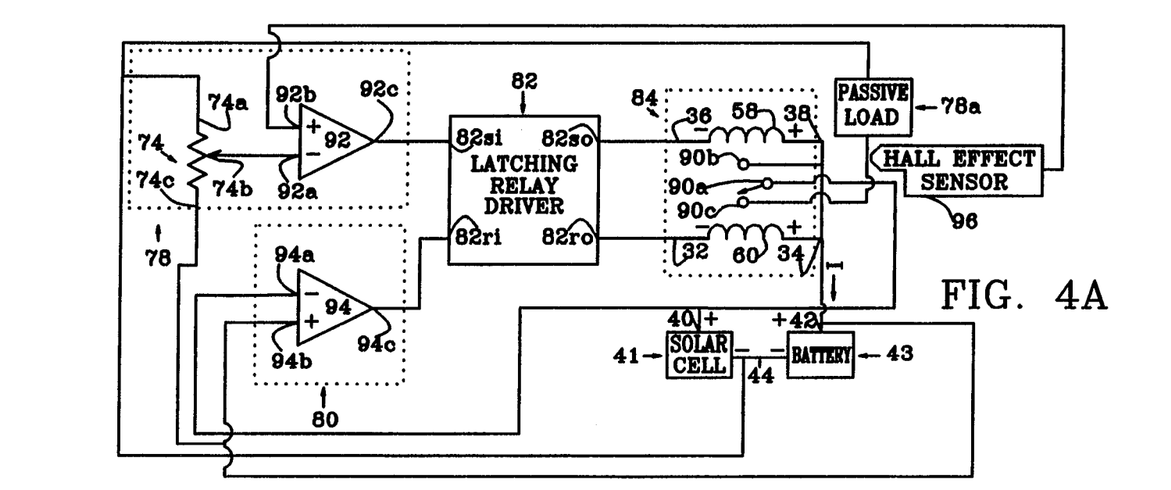
FIG. 4A is a schematic representation of a variant of the preferred embodiment including a Hall effect sensor for determining when to close the relay contacts.
Figure 4B:
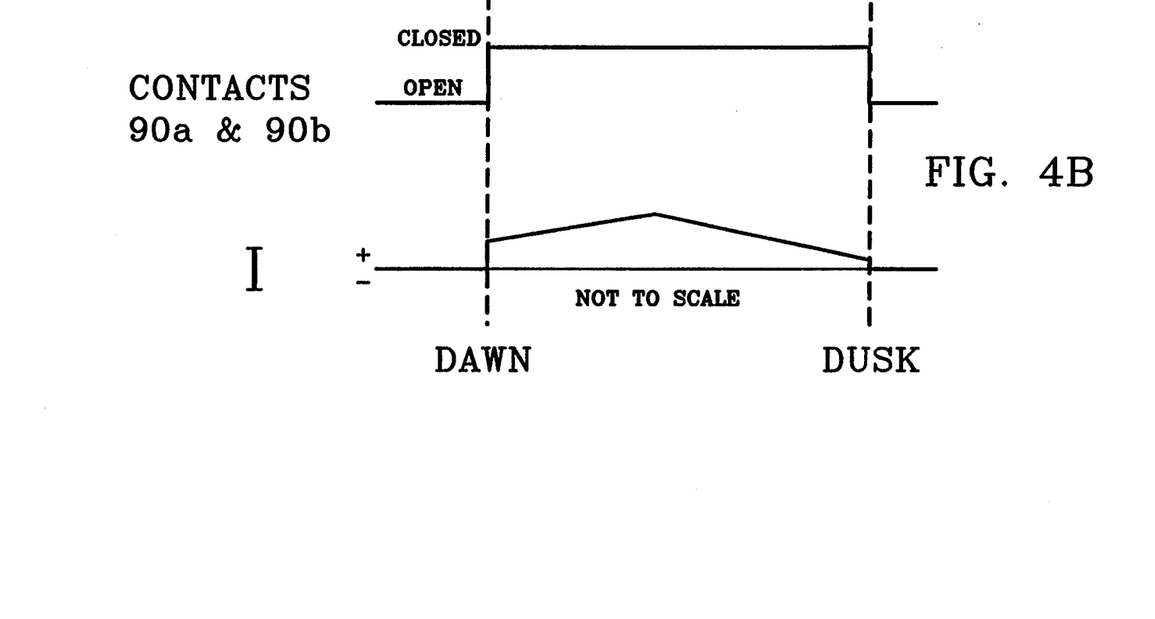
FIG. 4B is a timing diagram showing charging current vs. when the relay opens and closes in FIG. 4A.

FIG. 4A shows another variant of the preferred embodiment in which a double throw relay is used. Load circuit (78a) is a passive load connected across solar cell (41) while relay contacts (90a, 90b) are open and relay contacts (90a, 90c) are closed. First sensor circuit (78) includes a Hall effect proportional current sensor (96) located in close proximity to the conductor carrying current to load circuit (78a). Hall effect sensor (96) is connected to comparator input (92b). Potentiometer (74) adjusts the threshold at which comparator output (92c) will be active. When the solar cell (41) output current exceeds a predetermined maximum, Hall effect sensor (96) causes first sensor circuit (78) to enable relay driver (82) to enable relay contacts (90a, 90b) to close, disconnecting solar cell (41) from load circuit (78a), and connecting solar cell positive (40) to battery positive (42). An inductive type of current sensor could be substituted for Hall effect sensor (96) in this circuit. FIG. 4B is a timing diagram illustrating the relative current levels (I) when contacts (90a, 90b) are opened and closed.

Figure 5A:
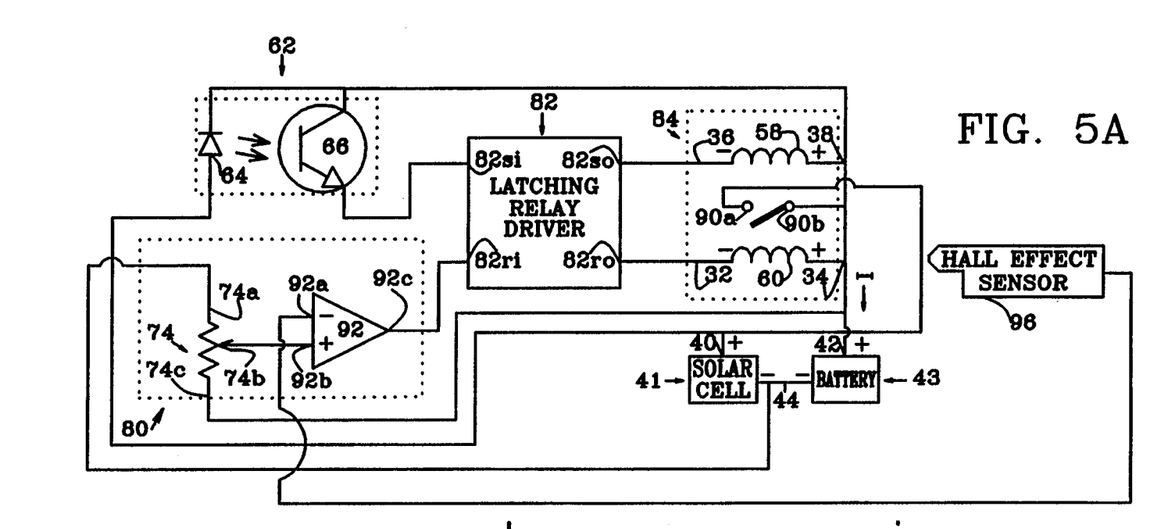
FIG. 5A is a schematic representation of a variant of the preferred embodiment including a Hall effect sensor for determining when to open the relay contacts.
Figure 5B:
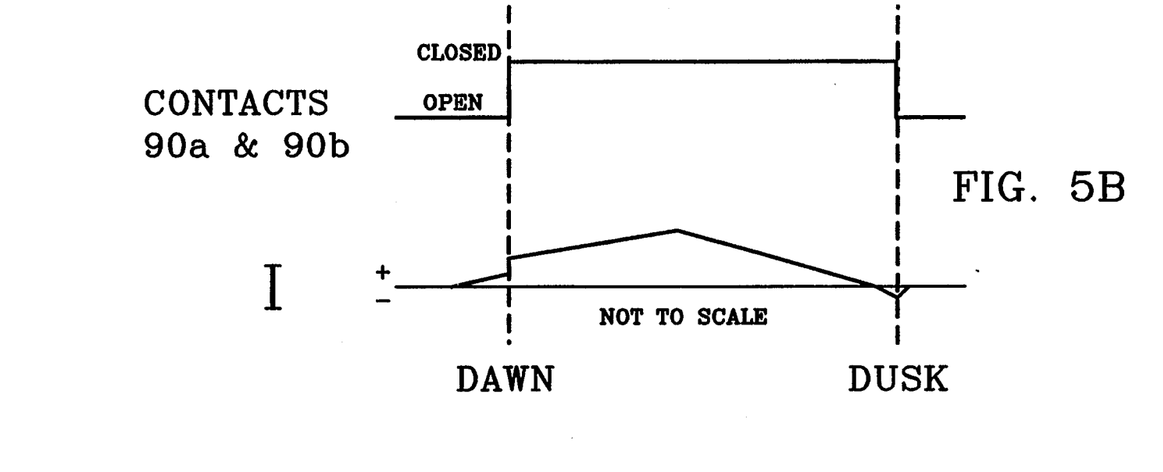
FIG. 5B is a timing diagram showing charging current vs. when the relay opens and closes in FIG. 5A.

FIG. 5A shows another variant of the preferred embodiment where second sensor circuit (80) includes a direction of current flow sensor such as a Hall effect sensor (96). Hall effect sensor (96) is placed in close proximity to one of the main current carrying conductors between solar cell (41) and battery (43). Hall effect sensor (96) is connected to comparator input (92a) and potentiometer (74) is adjusted to determine the threshold at which comparator output (92c) becomes active. When solar cell (41) ceases to generate sufficiently to charge battery (41), reverse current flow begins and Hall effect sensor (96) output goes negative, causing second sensor circuit (80) to enable relay driver (82) to cause relay contacts (90a, 90b) to open. An inductive type current sensor can be used instead of Hall effect sensor (96) in this circuit. FIG. 5B shows the relative current levels (I) when contacts (90a, 90b) are opened and closed.

In the circuit of FIG. 5A, either Hall effect or inductive type current sensors can be used in a proportional mode instead of a direction of current flow mode, with the threshold or trigger set point being set to a predetermined minimum current flow level.

In FIG. 1B, 2B, 3B, 4B, and 5B charging current is used only as parameter by which the function of the invention can be judged. The function is to prevent reverse current flow while allowing as much forward (charging) current flow as possible. In most of the illustrated circuits, generator power output, not charging current, is used to determine when to connect or disconnect the generator.

The various first sensor circuits and second sensor circuits can be mixed and matched in any combination, as long as the threshold set for the second sensor circuit is lower than the threshold set for the first sensor circuit.

Figure 6A:
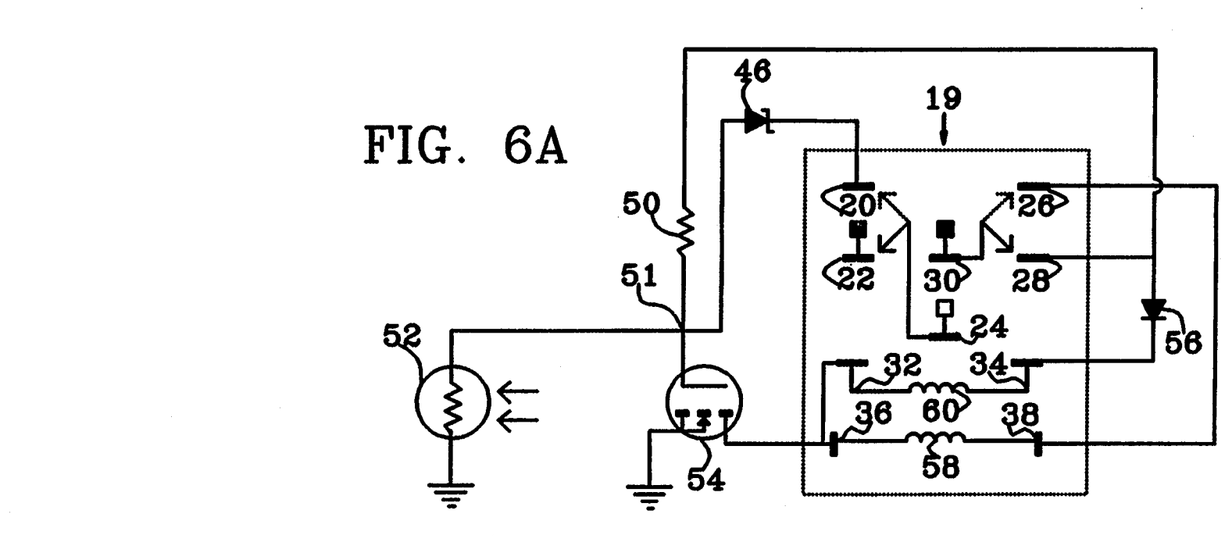
FIG. 6A is a schematic representation of a version of the invention which uses an ambient light sensor for determining when to open the relay contacts.
Figure 6B:
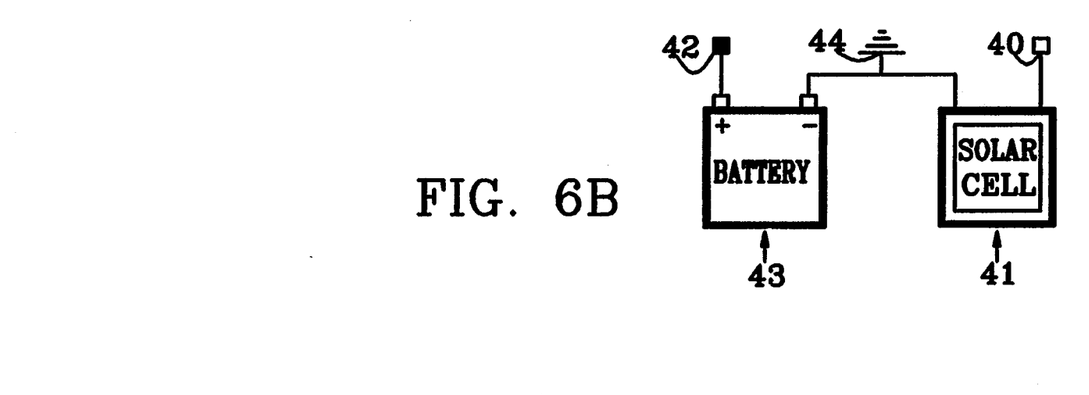
FIG. 6B shows the solar cell and battery section for FIG. 6A.
Figure 7A:
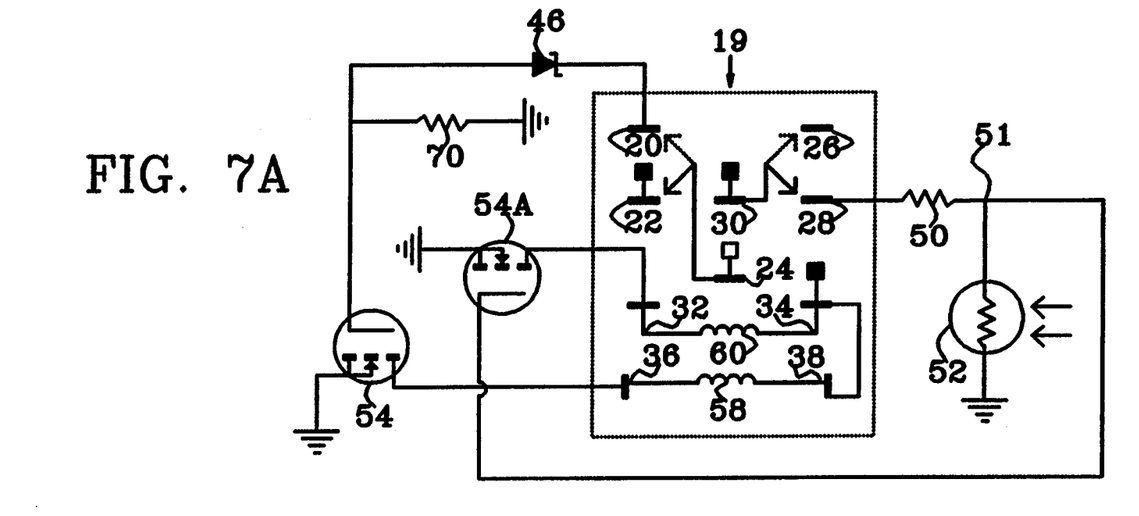
FIG. 7A is a schematic representation of a variant of the circuit shown in FIG. 6A which uses separate transistors to drive each relay coil.
Figure 7B:
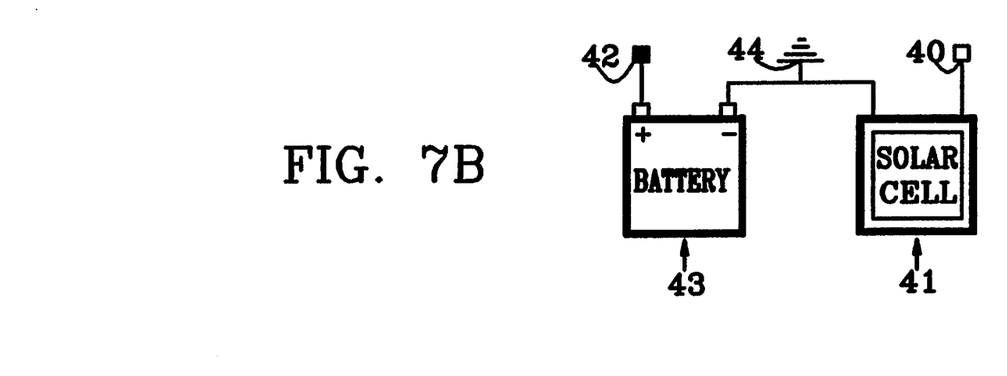
FIG. 7B shows the solar cell and battery section for FIG. 7A.
Figure 8A:
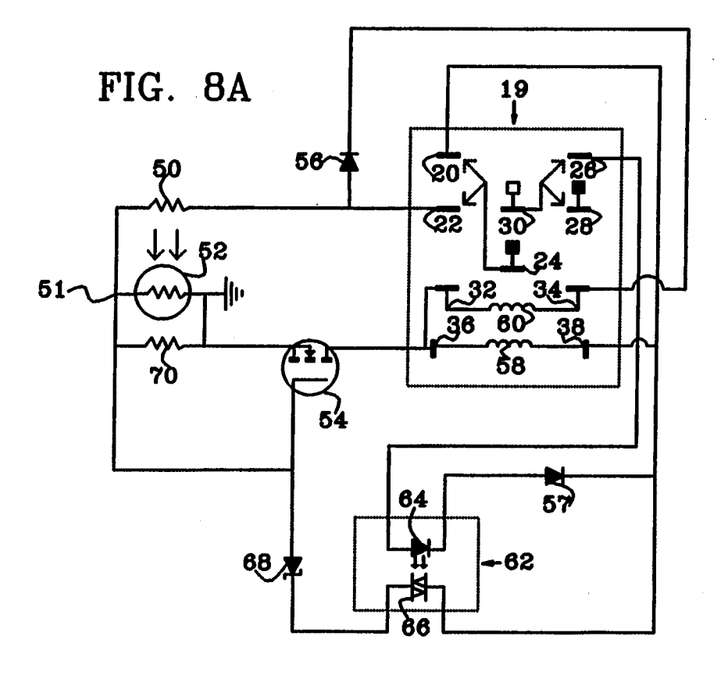
FIG. 8A is a schematic representation of a variant of the circuit shown in FIG. 6A which uses an optoisolator for determining when to close the relay contacts.
Figure 8B:
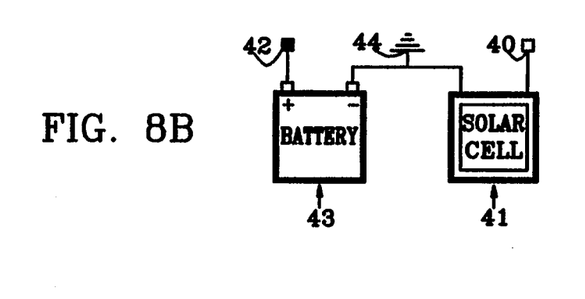
FIG. 8B shows the solar cell and battery section for FIG. 8A.

FIGS. 6-8 illustrate another version of the invention where an ambient light sensor is used to determine when to disconnect the solar cell from the battery.

FIG. 6A and 6B show a version of the invention where a double pole double throw dual coil latching relay (19) is the switch arrangement used to connect and disconnect a solar cell and a battery.

Sensor circuit and switch control circuit components include:

An N-channel MOSFET (54) which can supply current to either of relay coils (58, 60) for the amount of time needed to cause relay (19) to change state.

A zener diode (46) with a reverse breakdown voltage equal to solar cell (41) open circuit voltage at the desired time of connection to the battery minus MOSFET (54) gate threshold voltage.

A photoresistor (52) with unusually high resistance at illumination levels under 10 footcandles such as part #VT235 from EG&G Vactec, St. Louis, Mo. which has a resistance of about 1.4 mega ohms at 2 footcandles.

A fixed resistor (50) with a value which will allow threshold voltage to MOSFET (54) gate when photoresistor (52) value corresponds with the desired illumination level at the cut off point. The standard voltage divider formula may be used or the following derivative formula of my own: $R = (P\ ((E-G)/E))/(1 - ((E-G)/E))$ where R is fixed resistor (50) value in ohms, P is photoresistor (52) value in ohms at cut off illumination level, E is minimum battery voltage expected at cut off illumination level and G is MOSFET (54) gate threshold voltage.

A diode (56) such as IN4001 which will prevent voltage present at RESET coil positive terminal (34) from affecting the voltage present at MOSFET (54) gate.

Moving contact (24) and stationary contact (22) make up the actual point of connection between solar positive (40) and battery positive (42). After SET coil (58) is momentarily energized, moving contact (24) is connected to stationary contact (22). This connection is permanent until RESET coil (60) is momentarily energized.

Moving contact (30) becomes connected to RESET coil positive (34) through diode (56) after SET coil (58) is momentarily energized. Moving contact (30) becomes connected to SET coil positive after RESET coil (60) is momentarily energized.

MOSFET (54) source lead is connected to ground (44). MOSFET (54) drain lead is connected to both SET coil negative (36) and RESET coil negative (32). Thus, if MOSFET (54) gate voltage reaches approximately 4 volts (gate threshold), MOSFET (54) will turn on, supplying ground (44) to SET coil (58) and RESET coil (60).

Given the above set of interconnections, relay (19) will change states whenever more than approximately 4 volts is present at MOSFET (54) gate for the specified switching time of relay (19).

When relay (19) is in the SET state, resistor (50) and photoresistor (52) form a voltage divider which controls MOSFET (54) gate voltage. This occurs because battery positive (42) is connected to resistor (50) through moving contact (30) and stationary contact (28). When relay (19) is in the RESET state, there is no connection between battery positive (42) and resistor (50).

When relay (19) is in the RESET state, zener diode (46) controls MOSFET (54) gate voltage. This occurs because solar cell positive (40) is connected to the cathode of zener diode (46) through moving contact (24) and stationary contact (20). When relay (19) is in the SET state, there is no connection between solar cell positive (40) and zener diode (46).

Since resistor (50) only completes a circuit when the contacts of relay (19) are in the SET state, and zener diode (46) only completes a circuit when the contacts of relay (19) are in the RESET state, MOSFET (54) turns on as the illumination level falls if relay (19) is in a SET state and MOSFET (54) turns on as the illumination level rises if relay (19) is in a RESET state.

Photoresistor (52) is connected across ground (44) and MOSFET (54) gate lead. When it is daytime, relay (19) is normally in the SET state, connecting solar cell positive (40) to battery positive (42). Thus, moving contact (30) connects with stationary contact (28) and resistor (50) forms a voltage divider with photoresistor (52). Resistor (50) is a high value (such as 1 or 2 mega ohms). As long as the ambient light level is above the desired cut off point (such as 3 to 10 footcandles), photoresistor (52) value remains much lower than the value of resistor (50), holding MOSFET (54) gate at a voltage below the turn on threshold.

However, as illumination levels fall (as at dusk), photoresistor (52) increases in value and the voltage at MOSFET (54) gate increases. At the designed cut off illumination level (corresponding to the illumination level at which solar cell (41) no longer generates a voltage sufficient to charge battery (43)), MOSFET (54) turns on, supplying ground (44) to RESET coil (60). Relay (19) changes state, disconnecting solar cell positive (40) from battery positive (42).

Moving contact (24) is now connected to stationary contact (20) which connects the solar cell positive (40) to the cathode of zener diode (46). Through the period of low illumination level (such as night), MOSFET (54) gate is held low by photoresistor (52).

When illumination levels rise (as at dawn) and solar cell (41) generates and open circuit voltage which exceeds zener diode (46) reverse breakdown voltage (such as 10 volts) by approximately 4 volts, MOSFET (54) is turned on and supplies ground (44) to SET coil (58), causing relay (19) to change state. This change of state connects solar positive (40) to battery positive (42). Also, resistor (50) is once again connected across battery positive (42) and MOSFET (54) gate, forming a voltage divider with photoresistor (52). This begins another cycle of operation.

FIGS. 7A and 7B show a variant of the circuit of FIGS. 6A and 6B in which two MOSFETs are used, one for pulsing each relay coil. MOSFET (54) is connected to provide ground (44) to relay SET coil (58) if MOSFET (54) is in a conductive state. MOSFET (54) gate is controlled by zener diode (46) and resistor (70), so that MOSFET (54) conducts only if solar cell (41) voltage exceeds zener diode (46) reverse breakdown voltage by approximately 4 volts while relay (19) is in the RESET state. A second MOSFET (54A) is connected to supply ground (44) to relay RESET coil (60) if MOSFET (54A) is in the conductive state. MOSFET (54A) gate is controlled by the junction (51) of resistor (50) and photoresistor (52), so that MOSFET (54A) conducts only if the photoresistor (52) value rises above a selected level while relay (19) is in the SET state.

FIGS. 8A and 8B show a variant of the circuit shown in FIGS. 6A and 6B in which an optoisolator (62) is used to determine when the solar cell (41) is generating sufficiently to charge the battery (43). The optoisolator luminous element (64) (shown as an LED in FIG. 8A) is connected between the solar cell positive (40) and the battery positive (42). As shown in FIG. 8A, when the relay (19) is in the reset condition, the anode of the LED (64) is connected to the solar cell positive (40), and the cathode of the LED (64) is connected to the battery positive (43), through diode (57) which protects the LED (64) from reverse voltage. When the solar cell (41) voltage exceeds the battery (43) voltage by the combined forward voltage drop of LED (64) and diode (57), and the solar cell (41) is producing sufficient current to illuminate LED (64), the optoisolator output element (66) conducts, triggering MOSFET (54) into conduction, which changes the relay (19) state, connecting solar positive (40) to battery positive (42). FIG. 8A also shows a resistor (70) connected in parallel with photoresistor (52). Resistor (70) should be a high value which will not significantly affect circuit operation during the daytime, dawn transitions, or dusk transitions. However, during periods of complete darkness, when the photoresistor (52) value may rise to over 200 Megohms, resistor (70) will prevent MOSFET (54) from conducting by holding MOSFET (54) gate low. FIG. 8A shows a zener diode (68) used to protect MOSFET (54) gate from excessive voltage.

The basic system voltage for the component values given in the above circuits is 12 volts—however, many other system voltages can be accommodated with appropriate adjustments in component values and relay coil voltages.

FIGS. 1–5 show a dual coil latching relay (84) and relay driver (82) for controlling a dual coil latching relay. Any type of latching or non-latching relay or other type of switch arrangement can be readily substituted in these circuits, as long as an appropriate switch control circuit is used which can accept input requests from the sensor circuits (78, 80) and which can control the switch arrangement to open or close. The switch control circuit can be microprocessor or software based if desired.

This discussion does not attempt to give a detailed description of concrete designs for all the possible variations for the function blocks of the invention. This omission is intentional, on the grounds that a qualified electronic engineer, given the above examples and description of functions, can come up with the appropriate circuits, with no activity which rises to the inventive level being required of one skilled in the art. Further, the circuits may be embodied in numerous variations and can be produced by various techniques, e.g. they may be in the form of integrated circuits.

Accordingly, the scope of the invention should be determined not by the embodiment(s) illustrated, but by the appended claims and their legal equivalents.

We claim:

1. A circuit comprising:
   A. a switch arrangement connected between a generator which generates electricity and a storage device which stores electricity;
      i. said switch arrangement has a closed condition to connect said generator to said storage device, and an open condition to disconnect said generator from said storage device;
   B. a switch control circuit connected to said switch arrangement to selectively control said closed condition and said open condition;
   C. a first sensor circuit connected to said switch control circuit;
      i. said first sensor circuit, while said switch arrangement has said open condition, is for sensing when said generator is generating sufficiently to charge said storage device;
      ii. said first sensor circuit enables said switch control circuit to enable said switch arrangement to switch to said closed condition if an output of said generator exceeds a first predetermined power level while said switch arrangement has said open condition;
      iii. said first predetermined power level exists when said generator is generating sufficiently to substantially charge said storage device; and
   D. a second sensor circuit connected to said switch control circuit;
      i. said second sensor circuit, while said switch arrangement has said closed condition, is for sensing when said generator is no longer generating sufficiently to substantially charge said storage device;
      ii. said second sensor circuit enables said switch control circuit to enable said switch arrangement to switch to said open condition if said output of said generator falls to a second predetermined power level while said switch arrangement has said closed condition;
      iii. said second predetermined power level exists when said generator ceases to generate sufficiently to substantially charge said storage device;
      iv. said second predetermined power level is lower than said first predetermined power level so that a desirable hysteresis exists between conditions under which said switch arrangement switches to said closed condition and conditions under which said switch arrangement switches to said open condition.

2. A circuit as defined in claim 1 in which:
   E. said second sensor circuit includes a proportional current sensor for sensing current flow between said generator and said storage device.

3. A circuit as defined in claim 1 in which:
   E. said circuit includes means for forming a connecting path between said generator and said storage device;
      i. said second sensor circuit connected to a portion of said connecting path forming means is for measuring a voltage drop across said portion between said generator and said storage device; whereby
   F. said second sensor circuit enables said switch control circuit to enable said switch arrangement to switch to said open condition when said voltage drop falls to a predetermined minimum because said output of said generator falls to said second predetermined power level.

4. A circuit as defined in claim 3 in which:
   G. said switch arrangement includes a pole which is connected to a contact when said switch arrangement has said closed condition, and which is disconnected from said contact when said switch arrangement has said open condition;
   H. said generator is connected to said pole, and said storage device is connected to said contact; and
   I. said second sensor circuit is connected to measure said voltage drop across said pole and said contact.

5. A circuit as defined in claim 1 in which:
   E. said circuit includes means for forming a connecting path between said generator and said storage device;
      i. said second sensor circuit connected to a portion of said connecting path forming means includes a voltage polarity sensing circuit for sensing the polarity of a voltage drop across said portion between said generator and said storage device while said switch arrangement has said closed condition;
   F. said voltage polarity sensing circuit gives a first polarity indication when current flows from said generator toward said storage device and said voltage drop has a positive value;
   G. said voltage polarity sensing circuit gives a second polarity indication when current flows from said storage device toward said generator and said voltage drop has a negative value; and
   H. said second polarity indication enables said switch control circuit to enable said switch arrangement to switch to said open condition if said second polarity indication occurs while said switch arrangement has said closed condition.

6. A circuit as defined in claim 5 in which:
   I. said switch arrangement includes a pole which is connected to a contact when said switch arrangement has said closed condition, and which is disconnected from said contact when said switch arrangement has said open condition;
   J. said generator is connected to said pole, and said storage device is connected to said contact; and
   K. said voltage polarity sensing circuit includes a comparator circuit having a first input connected to said pole, a second input connected to said contact, and an output connected to said switch control circuit;
   whereby said comparator circuit output enables said switch control circuit to enable said switch arrangement to switch to said open condition if said second polarity indication occurs while said switch arrangement has said closed condition.

7. A circuit as defined in claim 1 in which said second sensor circuit includes a direction of current flow sensor for sensing when current flow from said generator toward said storage device is negative and for enabling said switch control circuit to enable said switch arrangement to switch to said open condition if negative current flow occurs while said switch arrangement has said closed condition.

8. A circuit as defined in claim 7 in which said direction of current flow sensor includes a Hall effect device.

9. A circuit as defined in claim 7 in which said direction of current flow sensor includes an inductive current sensing device.

10. A circuit as defined in claim 1 further including a load circuit for loading said generator while said switch arrangement has said open condition.

11. A circuit as defined in claim 10 in which said load circuit includes an optoisolator;
E. said optoisolator having a selectively luminous element having a cathode terminal connected to said storage device and an anode terminal connected to said generator while said switch arrangement has said open condition;
F. said optoisolator having an output element connected to said first sensor circuit; and
G. said optoisolator, while said switch arrangement has said open condition, enables said switch control circuit to enable said switch arrangement to switch to said closed condition if said generator voltage exceeds said storage device voltage by a predetermined amount related to the forward voltage drop of said selectively luminous element and if said generator is generating current sufficient to power said selectively luminous element.

12. A circuit as defined in claim 10 in which said first sensor circuit includes a proportional current sensing circuit for sensing when said generator output current exceeds a predetermined maximum.

13. A circuit as defined in claim 12 in which said proportional current sensing circuit includes a Hall effect device.

14. A circuit as defined in claim 12 in which said proportional current sensing circuit includes an inductive current sensor.

15. A circuit as defined in claim 10 in which said load circuit includes a diode which has a cathode terminal connected to said storage device and an anode terminal connected to said generator.

16. A circuit as defined in claim 15 in which:
E. said first sensor circuit senses forward voltage drop across said diode; and
F. said first sensor circuit enables said switch control circuit to enable said switch arrangement to switch to said closed condition if forward voltage drop across said diode exceeds a predetermined maximum forward voltage drop while said switch arrangement has said open condition.

17. A circuit as defined in claim 16 in which:
G. said first sensor circuit includes a comparator circuit having a first input connected to said cathode terminal, a second input connected to a center node of a voltage divider network, and an output connected to said switch control circuit;
H. said voltage divider network has a first terminal connected to ground potential and a second terminal connected to said anode terminal of said diode; and
I. said voltage divider network is adjusted to enable said center node voltage to equal a voltage present at said cathode terminal minus said forward voltage drop of said diode at a predetermined maximum current level;
whereby said output of said comparator circuit is enabled and said switch arrangement is switched to said closed condition when said generator outputs a voltage higher than said storage device voltage and a current capable of substantially charging said storage device as evidenced by said predetermined maximum forward voltage drop existing across said diode.

18. A circuit comprising;
A. a switch arrangement connected between a solar cell which generates electricity and a storage device which stores electricity;
i. said switch arrangement having a closed condition to connect said solar cell to said storage device, and an open condition to disconnect said solar cell from said storage device;
B. a switch control circuit connected to said switch arrangement to selectively control said closed condition and said open condition;
C. a first sensor circuit which is connected to said switch control circuit;
i. said first sensor circuit senses when said solar cell is generating sufficiently to charge said storage device, while said switch arrangement has said open condition;
ii. said first sensor circuit enables said switch control circuit to enable said switch arrangement to switch to said closed condition if said solar cell is generating sufficiently to charge said storage device while said switch arrangement has said open condition;
D. a second sensor circuit which is connected to said switch control circuit;
i. said second sensor circuit senses when said solar cell is no longer generating sufficiently to substantially charge said storage device, while said switch arrangement has said closed condition;
ii. said second sensor circuit includes an ambient light sensor for enabling said switch control circuit to enable said switch arrangement to switch to said open condition if ambient light falls below a predetermined minimum.
E. said switch arrangement includes:
i. an open control portion which, when energized, enables said switch to have said open condition;
ii. a close control portion which, when energized, enables said switch to have said closed condition; and
F. said switch control circuit is connected to selectively energize said open control portion and said close control portion.

19. A circuit as defined in claim 18 in which:
G. said switch arrangement includes:
i. a first pole connected to said solar cell, said first pole being selectively connectable to a first contact when said switch has said closed condition, and to a second contact when said switch has said open condition, said first contact being connected to said storage device to enable said solar cell to charge said storage device when said switch has said closed condition;

ii. a second pole connected to said storage device, said second pole being selectively connectable to a third contact to thereby connect said second pole to said open control portion when said switch has said closed condition, and to a fourth contact to thereby connect said second pole to said close control portion when said switch has said open condition;

H. said switch control circuit includes a common control element connected to both said open control portion and said close control portion for controlling the flow of current therethrough, said common control element having a gate terminal for turning said common control element on and off;

I. said gate terminal is connected to said first sensor circuit and said second sensor circuit;

J. said first sensor circuit is active while said switch arrangement has said open condition; and K. said second sensor circuit is active while said switch arrangement has said closed condition;

whereby said close control portion is energized if said common control element is turned on while said switch arrangement has said open condition, and said open control portion is energized if said common control element is turned on while said switch arrangement has said closed condition.

20. A circuit comprising;

A. a switch arrangement connected between a solar cell which generates electricity and a storage device which stores electricity;
 i. said switch arrangement having a closed condition to connect said solar cell to said storage device, and an open condition to disconnnect said solar cell from said storage device;

B. a switch control circuit connected to said switch arrangement to selectively control said closed condition and said open condition;

C. a first sensor circuit which is connected to said switch control circuit;
 i. said first sensor circuit senses when said solar cell is generating sufficiently to charge said storage device, while said switch arrangement has said open condition;
 ii. said first sensor circuit enables said switch control circuit to enable said switch arrangement to switch to said closed condition if said solar cell is generating sufficiently to charge said storage device while said switch arrangement has said open condition;

D. a second sensor circuit which is connected to said switch control circuit;
 i. said second sensor circuit senses when said solar cell is no longer generating sufficiently to substantially charge said storage device, while said switch arrangement has said closed condition;
 ii. said second sensor circuit includes an ambient light sensor for enabling said switch control circuit to enable said switch arrangement to switch to said open condition if ambient light falls below a predetermined minimum.

E. said first sensor circuit includes an optoisolator having a selectively luminous element, said selectively luminous element having a cathode terminal connected to said storage device and an anode terminal connected to said solar cell while said switch arrangement has said open condition whereby said switch arrangement will switch to said closed condition if said solar cell voltage exceeds said storage device voltage by a predetermined amount related to the forward voltage drop of said selectively luminous element and said solar cell is generating current sufficient to power said selectively luminous element while said switch arrangement has said open condition.

21. A circuit comprising;

A. a switch arrangement connected between a solar cell which generates electricity and a storage device which stores electricity;
 i. said switch arrangement having a closed condition to connect said solar cell to said storage device, and an open condition to disconnnect said solar cell from said storage device;

B. a switch control circuit connected to said switch arrangement to selectively control said closed condition and said open condition;

C. a first sensor circuit which is connected to said switch control circuit;
 i. said first sensor circuit senses when said solar cell is generating sufficiently to charge said storage device, while said switch arrangement has said open condition;
 ii. said first sensor circuit enables said switch control circuit to enable said switch arrangement to switch to said closed condition if said solar cell is generating sufficiently to charge said storage device while said switch arrangement has said open condition;

D. a second sensor circuit which is connected to said switch control circuit;
 i. said second sensor circuit senses when said solar cell is no longer generating sufficiently to substantially charge said storage device, while said switch arrangement has said closed condition;
 ii. said second sensor circuit includes an ambient light sensor for enabling said switch control circuit to enable said switch arrangement to switch to said open condition if ambient light falls below a predetermined minimum.

E. said second sensor circuit includes a photoresistor connected in series with a resistor having a selected resistance value;

F. a node at the junction between said photoresistor and said resistor provides a voltage signal which varies with ambient light; and G. said second sensor circuit enables said switch control circuit to enable said switch arrangement to switch to said open condition if said voltage signal reaches a predetermined level while said switch arrangement has said closed condition.

* * * * *